United States Patent
Zaitsev

(10) Patent No.: US 9,294,510 B2
(45) Date of Patent: Mar. 22, 2016

(54) SYSTEM AND METHOD FOR AUTOMATIC CONTROL OF SECURITY POLICIES BASED ON AVAILABLE SOFTWARE LICENSES

(71) Applicant: Kaspersky Lab ZAO, Moscow (RU)

(72) Inventor: Oleg V. Zaitsev, Moscow (RU)

(73) Assignee: Kaspersky Lab AO, Moscow (RU)

( * ) Notice: Subject to any disclaimer, the term of this patent is extended or adjusted under 35 U.S.C. 154(b) by 0 days.

(21) Appl. No.: 14/291,175

(22) Filed: May 30, 2014

(65) Prior Publication Data

US 2015/0188946 A1    Jul. 2, 2015

(30) Foreign Application Priority Data

Dec. 27, 2013    (RU) ................................ 2013158121

(51) Int. Cl.
*G06F 17/00*    (2006.01)
*H04L 29/06*    (2006.01)

(52) U.S. Cl.
CPC ............ *H04L 63/20* (2013.01); *H04L 63/0428* (2013.01); *H04L 63/14* (2013.01)

(58) Field of Classification Search
CPC ...... H04L 63/20; H04L 63/14; H04L 63/0428
USPC .......................................................... 726/1
See application file for complete search history.

(56) References Cited

U.S. PATENT DOCUMENTS

| | | | |
|---|---|---|---|
| 7,636,936 B2 * | 12/2009 | Wright ..................... | G06F 21/32 379/15.03 |
| 7,979,864 B2 * | 7/2011 | Meguro ........................ | 718/104 |
| 8,341,717 B1 | 12/2012 | Delker et al. | |
| 8,423,795 B2 | 4/2013 | Kawakami | |
| 8,429,424 B2 | 4/2013 | Witt et al. | |
| 2004/0172550 A1 | 9/2004 | Sai | |
| 2005/0160049 A1 | 7/2005 | Lundholm | |
| 2006/0080736 A1 * | 4/2006 | Park ...................... | G06F 21/577 726/22 |

(Continued)

FOREIGN PATENT DOCUMENTS

RU    105486 U1    6/2011
RU    2477929 A    10/2012

OTHER PUBLICATIONS

Weighted sum model, May 3rd, 2011, pp. 1-2.*

(Continued)

*Primary Examiner* — Luu Pham
*Assistant Examiner* — Canh Le
(74) *Attorney, Agent, or Firm* — Arent Fox LLP; Michael Fainberg

(57) ABSTRACT

Disclosed are system, methods, and computer program product for applying security policies based on available licenses to a plurality of devices. An example method includes determining, by a processor, one or more criteria for a device relating to a priority of the device in the network for application of the security policies; determining numeric values for each of the one of more criteria; determining a coefficient for the device based on the numeric values; determining the priority of the device based on the coefficient of the device and respective coefficients of the plurality of devices; designating a security policy for the device based on the priority of the device; determining availability of a license for a software applying the designated security policy to the device; and when the license for the software that applies the designated security policy is available, applying the designated security polity to the device.

13 Claims, 3 Drawing Sheets

(56) References Cited

U.S. PATENT DOCUMENTS

| | | |
|---|---|---|
| 2012/0046965 A1* | 2/2012 | Ryan et al. ............... 705/2 |
| 2012/0185945 A1 | 7/2012 | Andres et al. |
| 2013/0159704 A1 | 6/2013 | Chandrasekaran |
| 2014/0032618 A1* | 1/2014 | Bacher et al. ............ 707/812 |
| 2014/0052689 A1* | 2/2014 | Ficara et al. ............. 707/610 |
| 2014/0089306 A1* | 3/2014 | Rana et al. ............... 707/731 |

OTHER PUBLICATIONS

Meriem Kassar et al.,"An overview of vertical handover decision strategies in heterogeneous wireless networks," Computer Communications 31 (2008), pp. 2607-2620.*

Shun-Fang Tang et al., "A Vertical-Independent Handover Decision Algorithm across Wi-Fi and WiMAX Networks," IEEE, 2008, pp. 1-5.*

* cited by examiner

SYSTEM AND METHOD FOR AUTOMATIC CONTROL OF SECURITY POLICIES BASED ON AVAILABLE SOFTWARE LICENSES

CROSS-REFERENCE TO RELATED APPLICATIONS

This application claims benefit of priority under 35 U.S.C. 119(a)-(d) to a Russian Application No. 2013158121 filed on Dec. 27, 2013, which is incorporated by reference herein.

TECHNICAL FIELD

The present disclosure relates generally to the field of computer security, and more specifically, to systems and methods for automatic determination of the order of applying security policies to devices in a network based on the available number of licenses.

BACKGROUND

With the ever-increasing popularity of computers and personal communication devices, the number and diversity of devices used on corporate network is rapidly growing. For example, while corporate networks may have been previously limited to stationary computers and notebooks, now smart phones, tablets and other portable communication user devices are being used by employees alongside stationary computers and notebooks in the network. It is therefore becomes difficult for an administrator to manually manage so many user devices.

One of the techniques of automation of management of user devices connected to the corporate network is a sorting or classification of devices in accordance with certain features or criteria (e.g., the type of a device, the user of the device, the software installed on the device, and so on), with later use of such sorting to solve various network administration problems.

Some known device management techniques allow automatic assignment of network policies to user devices based on their classification. Other known techniques allow automatic determination of the number of licenses for software that performs various administrative tasks. However, these management techniques do not provide efficient response to changes in the number of user devices connected to the network or changes in the configuration of the devices, or an optimal protection of the user devices in a network with a limited set of licenses.

SUMMARY

Disclosed are example aspects for systems, method and computer program products for automatic determination of the order of applying security policies to user devices in a computer network based on the available number of software licenses. One technical result of the present aspects is to increase the level of protection of the user devices of a computer network with a limited set of licenses for the software implementing the security policies for the devices of the network by applying of designated security policies to the devices on the basis of the priority of the devices, which may be established by a sorting of the devices of the network on the basis of a determined value of the coefficient of the device.

In one aspect, an example method for applying security policies based on available licenses comprises determining, by a processor, one or more criteria for a device relating to a priority of the device in the network for application of the security policies; determining numeric values for each of the one of more criteria; determining a coefficient for the device based on the numeric values; determining the priority of the device based on the coefficient of the device and respective coefficients of the plurality of devices; designating a security policy for the device based on the priority of the device; determining availability of a license for a software applying the designated security policy to the device; and when the license for the software that applies the designated security policy is available, applying the designated security polity to the device.

In one aspect, the one or more criteria may include, but not limited to, users or owners of the device; software installed on the device; hardware of the device; files being kept on the device; a mobility of the device; and a location of the device in the network.

In one aspect, the numeric values of the one or more criteria may be determined by one or both of a control server and the device itself.

In one aspect, the coefficient for the device may be a weighted sum of the urn values.

In one aspect, the security policies may indicate whether it is necessary to encrypt the device; a place of the device in an encryption queue established after a sorting of the plurality of devices based on the respective coefficients; a type of encryption for the device indicating a full disk encryption or encryption of separate files; or an encryption algorithm for the device.

In one aspect, the coefficient for the device may be determined by using a database of security policies corresponding to different coefficients.

In one aspect, a first device with a first coefficient may have a higher priority than a second device with a second coefficient that is less than the first coefficient.

In one aspect, designating a security policy for the device based on the priority of the device may includes: determining software functionality that can apply, or can enable use of the available licenses to apply, the designated security policies to the device; determining one or more licenses among the available software licenses for applying the software functionality; and allocating the one or more licenses for applying the designated security policies to the device before other devices with lower priority.

In one aspect, the method may further comprise periodically recalculating the coefficient for the device; and when the coefficient changes, repeating determining the priority of the device based on the coefficient of the device and respective coefficients of the plurality of devices; designating a security policy for the device based on the priority of the device; determining availability of a license for a software applying the designated security policy to the device; and when the license for the software that applies the designated security policy is available, applying the designated security polity to the device.

In another aspect, an example system for applying security policies based on available licenses includes a processor configured to: determine one or more criteria for a device relating to a priority of the device in the network for application of the security policies; determine numeric values for each of the one of more criteria; determine a coefficient for the device based on the numeric values; determine the priority of the device based on the coefficient of the device and respective coefficients of the plurality of devices; designate a security policy for the device based on the priority of the device; determine availability of a license for a software applying the designated security policy to the device; and when the license for the software that applies the designated security policy is available, apply the designated security polity to the device.

In one aspect, an example computer program product stored on a non-transitory computer-readable storage medium, the computer program product comprising computer-executable instructions for applying security policies based on available licenses to a plurality of devices in a network, including instructions for: determining, by a processor, one or more criteria for a device relating to a priority of the device in the network for application of the security policies; determining numeric values for each of the one of more criteria; determining a coefficient for the device based on the numeric values; determining the priority of the device based on the coefficient of the device and respective coefficients of the plurality of devices; designating a security policy for the device based on the priority of the device; determining availability of a license for a software applying the designated security policy to the device; and when the license for the software that applies the designated security policy is available, applying the designated security polity to the device. The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
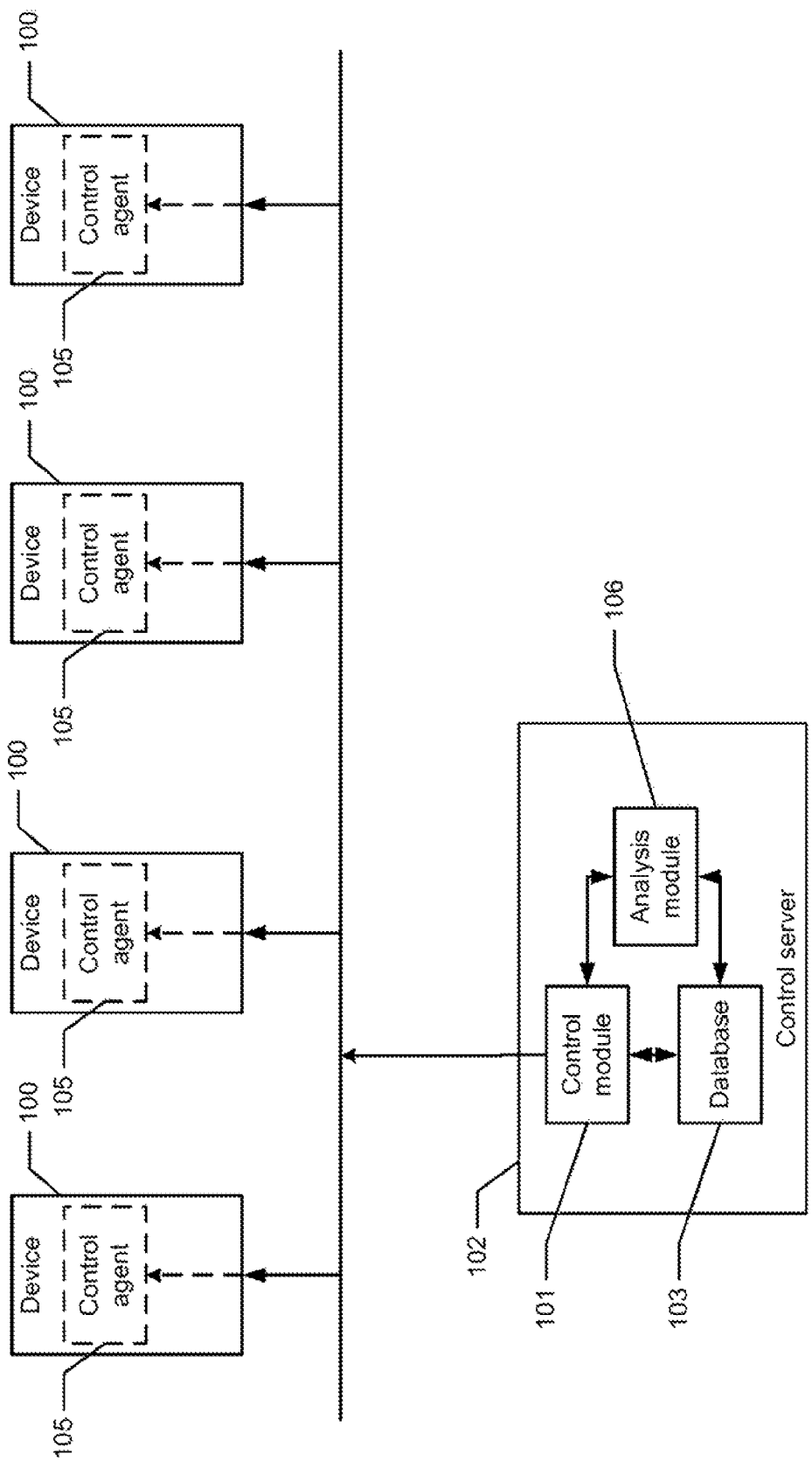
FIG. 1 shows a diagram of an example automatic system for designation of encryption policies for user devices based on the available number of licenses in accordance with one example aspect.

Example aspects are described herein in the context of a system, method and computer program product for determination of the order of applying security policies to devices in a network based on the available number of licenses. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Sorting or classification of user devices on a corporate network may be used to provide appropriate protection for these devices by, for example, determining the priority of the devices when applying security policies to the devices. The security policies may be applied under conditions of a limited number of licenses for the software used to apply the security policies to the device. In some example aspects, security policy may refer to a series of technological approaches (e.g., encryption of files including confidential information, ban on the use of external drives, the use of antivirus software, and so on) which regulate the control, the protection, and the distribution of valuable information. The security policies in some example aspects may include encryption policies and antivirus protection policies. The software used to apply the security policies in some example aspects is antivirus software with broad functionality, part of which may be limited by an active license. Such software in some example aspects may be used to encrypt data stored on the user devices. The type of encryption may be also controlled by the license. For example, one license may allow encryption of files only, while another one may enable use of full disk encryption. In another example aspect, the antivirus software may also be functionally limited by an active license, for example, the license may allow only access to a local database of antivirus records and may not allow access to antivirus databases hosted on remote servers.

In one example aspect, it is desirable to identify user devices that have highest priority for protection and applying security policies to them first. Therefore, the priority of the user devices may be determined via sorting or classification of all user devices in the network. For the sorting of the user devices, in one example aspect, it is desirable to obtain a broad set of criteria characterizing the device. Such criteria may include, but not limited to, the users of the devices, the software installed on the devices, the hardware of the devices, the files being stored on the device, and the location of the device in a corporate local-area network.

In one example aspect, device location criteria may be used to determine the mobility of the device, such as, for example, whether the device leaves the bounds of the corporate local-area network, where within the corporate network the device is located, and so on. Statistics as to the location may be obtained, for example, by analyzing the points of access to which the device is connected, from the subnet mask, or by using data from a geolocation module of the device. If it is established that the device is in motion, the device is classified as mobile for a criterion of mobility, otherwise the device is classified as nonmobile (i.e., stationary). This criterion may also be determined by analyzing data about the hardware of the device; if the hardware corresponds to a notebook or a cell phone then it may be classified as mobile. In some aspects, not only cell phones, notebooks or tablets may be classified mobile, but also stationary PCs may be moved around, for example, travel from one work site to another. In some example aspects, the location of the device criteria may be used to determine the following types of location: the device is not moving, the device is moving within the corporate network, or the device is leaving the bounds of the corporate network.

In one example aspect, the criteria of the user of the devices identify the owners of the devices or the persons who are temporarily using a particular device for work. These criteria may indicate either a particular person or a certain group of users, such as administrators, senior managers, developers, and so on. A particular person may be determined, for example, by his/her name and job title, identification number (e.g., Social Security number), or account record. This group of criteria may also characterize the behavior of the user; in one example aspect, these criteria may be used to determine the use of removable data media by the user, user working on the Internet, and the installation of application software on the device.

In one example aspect, the criteria of software may characterize the software installed on the user device and in control of the device (e.g., the operating system and components, applications, microprograms, and so on). In a particular aspect, these criteria may indicate specific software; for example, the criterion KIS indicates whether Kaspersky Internet Security (KIS) has been installed on the device. In another particular aspect, the criteria indicate the version of the software, such as the criterion KIS 2010 indicating whether the KIS version 2010 has been installed on the device. The criteria also determine the affiliation of the software with a particular group, such as gaming software, office programs, browsers, antivirus software, special software, and so on. Special software may refer to a set of programs used to solve a particular class of problems, such as the software of an automated control system for technological processes. The criterion may also characterize the vulnerability of the software, e.g., by showing how much the given software threatens the security of the device. During the sorting to determine the first priority devices that need to be updated, in a particular aspect, a criterion is used for the age of the software, indicating how old the software is.

In one example aspect, files criteria may characterize the files being stored on the user device. These criteria may be related to the type of documents being stored, the number of these documents, the classification level of the documents (e.g., a special marking which shows the degree of secrecy of the information stored on their data storage medium) or their confidentiality (e.g., the information kept in the document is publicly accessible, or its access is restricted to a group of people). These criteria may be used to determine the designation and purposes of use of the device, for example, the computer of a secretary or a developer, a server with a database, the mobile device of a particular person, and so on.

In one example aspect, to obtain the values of the criteria a control agent on the device may be used to sort through and analyzes the documents being stored on the device. For example, the control agent may determine the type of the documents, the confidentiality of the documents and the classification level. To determine the confidentiality, in one example aspect, the control agent may use the methods of searching through a dictionary, syntax sorting of document fragments by a template, and digital fingerprint technologies. To determine the classification level, in one example aspect, the control agent may use the same methods and technologies as for the determination of the confidentiality.

In various example aspects, these criteria may take on both Boolean values and certain discrete values depending on the purposes of the sorting. For example, the criterion of vulnerability of the software in one example aspect may take on values of 0—vulnerable or 1—no vulnerabilities found in the given software. In another example aspect, this criterion takes on values from 0 to 5, where 0 characterizes software in which no vulnerabilities are known, while 5 characterizes software in which vulnerabilities are regularly found.

Depending on the purposes of the sorting, different criteria may be chosen. The sorting of devices may be performed by descending or ascending coefficient of the device, which is obtained on the basis of the criteria. The coefficient of the device, in one example aspect, may be obtained using, for example, neural network, fuzzy logic, and/or adding up with weighting of the significance of the criteria. In one example, the coefficient may have a different applied value, depending on the criteria used for the scorekeeping and the purposes of the sorting.

Figure 2:
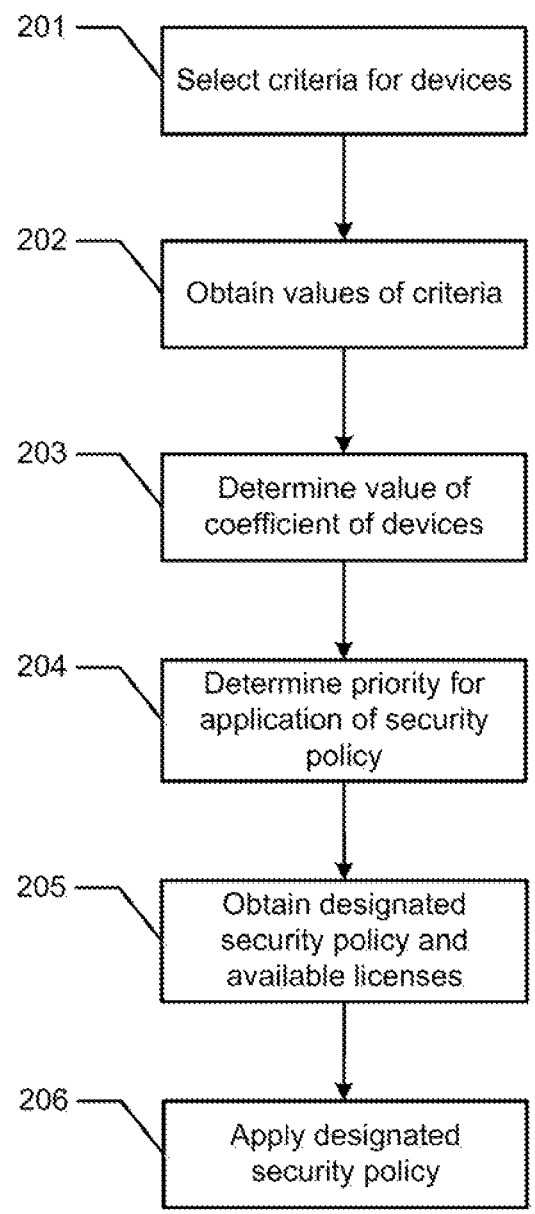
FIG. 2 shows a flowchart of an example method for designation of an encryption polices for user devices based on the available number of licenses in accordance with one example aspect.

In one example aspect, in order to implement a protection of user devices in a network with a limited set of licenses, an example system of FIG. 1 and method of FIG. 2 may be used. First, at step 201 of FIG. 2, various criteria characterizing user devices in the network from the standpoint of priority of application of a security policy may be determined. For example, such criteria may include, but not limited to: criteria determining the mobility of the device; criteria determining the owners of the devices or the individual who are temporarily using the device for work; criteria characterizing the documents and files stored on the device. These criteria may be chosen for each sorting or classification of the user devices based on established rules in the network. After the criteria have been determined, at step 202, the values of the values of the criteria may be determined. There are different ways of obtaining the values. In one example aspect, with reference to FIG. 1, a user device 100 may use a control agent 105 installed thereon to obtain values of different criteria and send them to a control server 102. In another example aspect, the control server 102 may independently obtain these values. For example, to determine the location of the user device 100 the control server 102 may obtain data from the control agent 105, which in turn obtains the data from geolocation services. In another example aspect, the control server 102 may determine the subnet in which the user device 100 is operating. In yet another example aspect, a mixed method may be used to obtain the values of the criteria, in which depending on the situation the control server 102 uses both the control agent 105 and its own services, such as a port scanner. After obtaining the values of the criteria, they are processed, at step 223, to determine the coefficient of the user device. There are various techniques for obtaining the coefficient of the device. For example, the coefficient may be obtained by adding up values of criteria, which may be weighted based on their significance:

$$Kf = X_1 * Kr_1 + X_2 * Kr_2 + X_3 * Kr_3 + \ldots + X_n Kr_n,$$

where:
Kf is the coefficient of the device;
$X_n$ is the significance factor;
$Kr_n$ is the value of the criterion.

The significance factor indicates the importance of the criterion being used, and this factor may be determined by the prevailing rules in the network or may be rigidly assigned in sorting algorithms. Using this factor lets one account for differences in the significance of the criteria. Thus, the values of the coefficients are determined for the devices that need to have the designated security policies applied to them. After determining the value of the device coefficient, the devices may be sorted at step 204. The sorting of user devices, in one example aspect, may be performed by arranging devices in order of increasing coefficient. In another example aspect, the sorting may be performed by arranging in decreasing order of coefficients. For example, the highest priority may be given to devices with the largest coefficient. In another example aspect, the highest priority may be given to devices with the lowest coefficient. Having determined the priority, the designated policies for the user devices and the available licenses for the software used to apply the security policies may be obtained at step 205. The source of this information in one example aspect is the network database. Having obtained the security policies and available licenses, one applies the designated security policies to the devices in the order of priority at step 206. For example, the security policy may be applied to the devices having the highest priority, then the policies are applied to the devices with the lower priority.

The security policy in one example aspect may be designated based on the value of the coefficient. For example, the encryption policy may establish:
1) the need for encryption, which indicates whether it is necessary to encrypt the devices
2) the order of encrypting each device—the order of encryption indicates the place in the encryption queue, it may be established after a sorting of the devices in terms of the coefficients obtained for the devices;
3) the type of encryption specifies full disk encryption of the device or encryption of separate files of the device;
4) the encryption algorithm.

In one example aspect, a database may be used to establish the encryption policy based of the coefficient of the device. One example of the database is shown in Table 1.

TABLE 1

An example database of encryption policies based on device coefficients

| Coefficient of device | Encryption policy for the devices |
| --- | --- |
| Kf > 5 | Full disk encryption of all sectors of the data media of the device |
| Kf > 4 | Encryption of all files on the device except executable ones and libraries of components |
| Kf > 3 | Encryption of confidential, secret, and all text documents and images |
| Kf > 2 | Encryption of confidential, secret, and all text documents |
| Kf > 1 | Encryption of confidential and secret documents |
| Kf = 1, Kf < 1 | No encryption is done |

In Table 1, the left-hand column indicates the value of the coefficient of the device, while the right-hand column shows the corresponding policy. In another example aspect, the database may be as shown in Table 2.

TABLE 2

Another example database of encryption policies based on device coefficients

| Policy element | Coefficient of device |
| --- | --- |
| Full disk encryption | Kf > 5 |
| Encryption of executable files | Kf > 4 |
| Encryption of images | Kf > 3 |
| Encryption of text documents | Kf > 2 |
| Encryption of confidential documents | Kf > 1 |
| Encryption of secret documents | Kf > 1 |
| ... | ... |

In Table 2, the left-hand column indicates the policy elements, while the right-hand column shows the value of the coefficient at which the element is included in the policy. Thus, the policy may be assembled from the elements in accordance with the coefficient that is calculated. In a first example, the policies are rigidly set, and in a second example, they are flexible. In the case where the policy is not rigid, as in Table 1, but flexible as in Table 2, the policy may be defined in accordance with a calculated coefficient, and in the case where the coefficient is reduced/enlarged, the policy items may be dynamically removed/added without a need to define a new policy as in Table 1. After establishing the encryption policy of the device, these encryption policies are applied to the device.

A calculation of the coefficient for a user device 100 using the above-disclosed methodology is illustrated next. For the calculation of the coefficient for a mobile device belonging to a senior manager, on which confidential documents are being stored, the following criteria may be selected: mobility ($X_1$), presence of confidential documents ($X_2$), job title of the user of the device ($X_3$). The following values are determined for the criteria: $X_1=1$ (device is mobile), $X_2=1$ (device is storing confidential documents), $X_3=2$ (device of a manager). The coefficient of the user device may be determined as follows:

$$Kf=X_1*Kr_1+X_2*Kr_2+X_3*Kr_3=1.1*1+2*1+0.5*2=4.1$$

Based on the computed value of coefficient Kf, and according to Table 1, the designated encryption policy for the devices provides that all files on the device, except for executable files and libraries of components, must be encrypted.

FIG. 1 shows example system for designation of an encryption polices for user devices based on the available number of licenses in accordance with one example aspect. The system includes a user devices 100 for which it is necessary to apply security policies. The user device 100 may be a PC, notebook, tablet, smartphone, flash card or other type of device that stores and communicates data. The control module 101, installed on the control server 102, has a network connection with the devices 100. The control module 101 is connected to a database 103 storing information on the criteria, the designated security policies, and the available software licenses, and to the analysis module 106. The analysis module 106 selects the criteria whose values are needed to determine the coefficient of the device. The selection is made in one example aspect by extracting these criteria from the current rules established for designating the security policies. The rules are kept in the database 103 and in one example aspect they are a listing of criteria. After selecting the criteria, the analysis module 106 sends the criteria to the control module 101. The control module 101 obtains the values of these criteria for the device 100. To obtain the criteria the control module 101 queries the device 100 itself and the database 103. Using the obtained values, the control module 101 calculates the coefficient of the device 100. After calculating the coefficient of the device for all the devices, the control module 101 sends the values of the coefficient to the analysis module 106. The analysis module 106 performs a sorting of the devices in accordance with the coefficient so calculated and saves the results in the database 103. The control module 101 obtains the available licenses and the designated security policies and applies them to the devices 100, in order of priority.

In one example aspect, the analysis module 106 separates the designated security policies into elements (example of which, will be provided below) and determines what software, and its particular functionality, can be used to apply the specified elements of the security policy to the user devices. During the application of security policies to the user devices, when the order of priority comes to the application of the designated security policy, the analysis module 106 may select from the available software licenses the one that allows for use of the necessary functionality of the software for application of designated security policy. In one example aspect, if no license is available allowing for application of the designated security policy in full, then a license may be chosen that allows the use of that volume of functionality enabling the most complete application of the security policy that is possible.

An example of operation of the above-described system is provided next. Let's assume that there are three devices with designated security policies. Control agents 105 may be deployed on user devices 100 for applying designated encryption policies. Also, let's assume that there are two licenses: one allowing for use of the entire functionality of control agents 105, and the other limiting the agents 105 based on its functionality and only allows file encryption. Example user devices and the encryption policies are presented in Table 3 below.

TABLE 3

An example of three devices and their encryption policies

| User Devices | Encryption policies |
| --- | --- |
| 1. Notebook<br>User: manager<br>Mobility: yes<br>Confidential data: yes | Full disk encryption of all sectors of the data media of the device |
| 2. Stationary PC<br>User: specialist<br>Mobility: no<br>Confidential data: yes | Encryption of confidential and secret documents |
| 3. Notebook<br>User: specialist<br>Mobility: yes<br>Confidential data: yes | Encryption of confidential and secret documents |

The following criteria may be used for the calculation of coefficients of the user devices: mobility ($X_1$), presence of confidential documents ($X_2$), job title of the user of the device ($X_3$). The values are determined for the criteria $X_1=1$ (device is mobile), $X_1=0$ (device is not mobile), $X_2=1$ (device is keeping confidential documents), $X_3=2$ (device of a manager), $X_3=1$ (device of a specialist). We determine the coefficient of the devices:

$$Kf_1 = X_1*Kr_1 + X_2*Kr_2 + X_3*Kr_3 = 1.1*1 + 2*1 + 0.5*2 = 4.1$$

$$Kf_2 = X_1*Kr_1 + X_2*Kr_2 + X_3*Kr_3 = 1.1*0 + 2*1 + 0.5*1 = 2.5$$

$$Kf_3 = X_1*Kr_1 + X_2*Kr_2 + X_3*Kr_3 = 1.1*1 + 2*1 + 0.5*1 = 3.6$$

After determining the values of the coefficients, the analysis module 106 performs a sorting of the user devices in accordance with the calculated coefficient and saves the results in the database 103. As a result of the sorting, the highest priority goes to the notebook of the manager, followed by the notebook of the specialist, and the lowest priority goes to the stationary PC of the specialist. As a result of the determination of the priority, the control module 101 applies the encryption policy to the manager's notebook in the first place. Particularly, the analysis module 106 analyzes the encryption policy for this device and determines the need to use, from the available software licenses, the fully functional license enabling full disk encryption. For the specialist's notebook, the remaining license may be used. No policies are applied to the stationary PC, due to lack of available licenses.

In one example aspect, the analysis module 103 sends the encryption policies to the control module 101, which applies the designated policies to the user device 100. In one example aspect, a control agent 105, installed on the device 100, may be used to apply the designated encryption policy to the device 100.

In one example aspect, the described system may be used to determine the necessary number of licenses to be purchased for software enabling the encryption of the devices. For this, the above-described system may calculate the coefficients of the user devices in the network and establish the encryption policies for these devices. The analysis module 106, during analysis of the designated policies, may determine the number of devices that need encryption, for example N devices, and also determines which of these devices need full disk encryption, for example M devices, and also which of them need file encryption, that is N-M devices. As a result, the recommended number of licenses to be purchased is N, of which M should permit a full disk encryption, while NM licenses permit the application of file encryption. In addition, the disclosed system may perform a repeat calculation of coefficients for user devices in the network, such as once a month or when new devices are connected to the network. Such a periodic recalculation of coefficients allows maintenance of the necessary number of licenses in an up-to-date status.

In yet another example aspect, the described system may perform a periodic recalculation of the coefficient of the device for devices in the network and when the device coefficient changes the priority of application of the security policies is reviewed.

Figure 3:
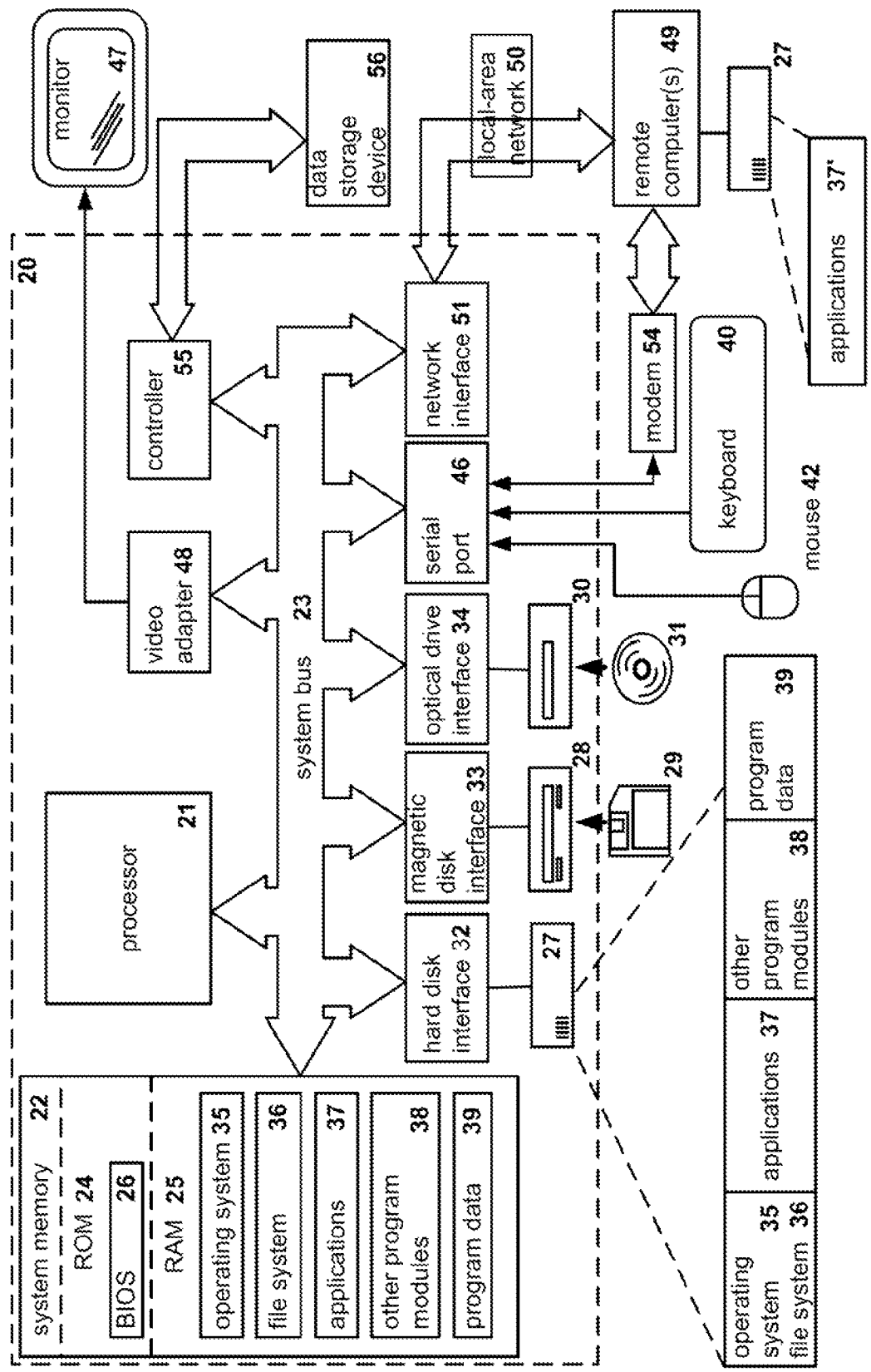
FIG. 3 shows an example of a general-purpose computer system that may be used to implement systems and methods for designation of encryption policies for user devices based on the available number of licenses in accordance with various example aspects.

FIG. 3 shows an example of a general-purpose computer system (which may be a personal computer or a server) 20, which may be used to implement aspects of system and methods disclosed herein. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to work in a network environment, using a network connection to one or more remote computers 49. The remote computer (or computers) 49 are also personal computers or servers having the majority or all of the aforementioned elements in describing the nature of a personal computer 20, as shown in FIG. 4. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for applying encryption policies based on available licenses to a plurality of devices connected in a network, the method comprising:
   determining, by a hardware processor, a plurality of criteria for a device relating to determining a priority of the device among a plurality of devices connected in the network;
   determining numeric values for each of the criteria;
   determining a coefficient for the device as a weighted sum by respectively applying significance factors to each of the numeric values, the significance factors being designated by rules of the network;
   comparing the coefficient for the device with respective coefficients of the plurality of devices connected in the network to determine the priority of the device;
   based on the coefficient for the device, identifying one of a plurality of encryption policies by accessing a database of encryption policies that indicates that each encryption policy corresponds to a different respective coefficient and identifying the one of the plurality of encryption policies that corresponds to the coefficient for the device;
   designating the identified encryption policy for the device; and
   installing a software application on the device to apply the designated encryption policy to the device when the priority of the device is within a number of the available licenses for the software application;
   wherein designating the identified encryption policy for the device based on the priority of the device includes:
      determining software functionality that is configured to apply the identified encryption policies to the device;
      determining one or more licenses among the available software licenses for applying the software functionality; and
      allocating the one or more licenses for applying the identified encryption policies to the device before other devices with lower priority.

2. The method of claim 1, wherein the plurality of criteria include one or more of:
   users or owners of the device;
   software installed on the device;
   hardware of the device;

files being kept on the device;
a mobility of the device; and
a location of the device in the network.

3. The method of claim 1, wherein the numeric values of the plurality of criteria are determined by one or both of a control server and the device itself.

4. The method of claim 1, wherein the encryption policies indicate one or more of:
whether it is necessary to encrypt data or files stored on the device;
a place of the device in an encryption queue established after a sorting of the plurality of devices based on the respective coefficients;
a type of encryption for the device indicating a full disk encryption or encryption of separate files; and
an encryption algorithm for the device.

5. The method of claim 1, wherein a first device with a first coefficient has a higher priority than a second device with a second coefficient that is less than the first coefficient.

6. The method of claim 1, further comprising:
periodically recalculating the coefficient for the device; and
when the coefficient changes, repeating
determining the priority of the device based on the coefficient of the device and respective coefficients of the plurality of devices;
designating an encryption policy for the device based on the priority of the device;
determining the number of available licenses available for the software application configured to apply the designated encryption policy to the device; and
when the license for the software that applies the designated encryption policy is available, installing the software application to apply the designated encryption policy to the device.

7. A system for applying encryption policies based on available licenses to a plurality of devices connected in a network, the system comprising:
a hardware processor configured to:
determine a plurality of criteria for a device relating to determining a priority of the device among a plurality of devices connected in the network for applying the encryption;
determine numeric values for each of the one of more criteria;
determine a coefficient for the device as a weighted sum by respectively applying significance factors to each of the numeric values, the significance factors being designated by rules of the network;
compare the coefficient for the device with respective coefficients of the plurality of devices connected in the network to determine the priority of the device;
identify one of a plurality of encryption policies based on the coefficient for the device, identify one of a plurality of encryption policies by accessing a database of encryption policies that indicates that each encryption policy corresponds to a different respective coefficient and identifying the one of the plurality of encryption policies that corresponds to the coefficient for the device;
designate the identified encryption policy for the device; and
install a software application on the device to apply the designated encryption policy to the device when the priority of the device is within a number of the available licenses for the software application;
wherein to designate the identified encryption policy for the device based on the priority of the device, the hardware processor is configured to:
determine software functionality that is configured to apply, or is configured to enable use of the available licenses to apply, the designated encryption policies to the device;
determine one or more licenses among the available software licenses for applying the software functionality; and
allocate the one or more licenses for applying the designated encryption policies to the device before other devices with lower priority.

8. The system of claim 7, wherein the plurality of one or more criteria include one or more of:
users or owners of the device;
software installed on the device;
hardware of the device;
files being kept on the device;
a mobility of the device; and
a location of the device in the network.

9. The system of claim 7, wherein the numeric values of the plurality of criteria are determined by one or both of a control server and the device itself.

10. The system of claim 7, wherein the encryption policies indicate one or more of:
whether it is necessary to encrypt data or files stored on the device;
a place of the device in an encryption queue established after a sorting of the plurality of devices based on the respective coefficients;
a type of encryption for the device indicating a full disk encryption or encryption of separate files; and
an encryption algorithm for the device.

11. The system of claim 7, wherein a first device with a first coefficient has a higher priority than a second device with a second coefficient that is less than the first coefficient.

12. The system of claim 7, wherein the processor is further configured to:
periodically recalculate the coefficient for the device; and
when the coefficient changes, repeat
determining of the priority of the device based on the coefficient of the device and respective coefficients of the plurality of devices,
determining of the designated encryption policies and the number of available licenses,
determining of which of the designated encryption policies to be applied to the device, and
when there is the at least one encryption policy that is determined to be applied to the device, installing he software application to apply the at least one encryption policy to the device.

13. A computer program product stored on a non-transitory computer-readable storage medium, the computer program product comprising computer-executable instructions for applying encryption policies based on available licenses to a plurality of devices connected in a network, including instructions for:
determining, by a processor, a plurality of criteria for a device relating to determining a priority of the device among a plurality of devices connected in the network for applying the encryption policies;
determining numeric values for each of the one of more criteria;
determining a coefficient for the device as a weighted sum by respectively applying significance factors to each of the numeric values, the significance factors being designated by rules of the network;

comparing the coefficient for the device with respective coefficients of the plurality of devices connected in the network to determine the priority of the device;

based on the coefficient for the device, identifying one of a plurality of encryption policies by accessing a database of encryption policies that indicates that each encryption policy corresponds to a different respective coefficient and identifying the one of the plurality of encryption policies that corresponds to the coefficient for the device;

designating the identified encryption policy for the device; and installing a software application on the device to apply the designated encryption policy to the device when the priority of the device is within a number of the available licenses for the software application;

wherein designating the identified encryption policy for the device based on the priority of the device further includes instructions for:

determining software functionality that can apply, or can enable use of the available licenses to apply, the designated encryption policies to the device;

determining one or more licenses among the available software licenses for applying the software functionality; and allocating the one or more licenses for applying the designated encryption policies to the device before other devices with lower priority.

* * * * *